United States Patent [19]

Koura et al.

[11] Patent Number: 5,072,163

[45] Date of Patent: Dec. 10, 1991

[54] FEEDING SYSTEM FOR ELECTRIC DEVICES MOUNTED IN DOOR

[75] Inventors: Soushichi Koura; Jun Yamagishi, both of Yokohama, Japan

[73] Assignee: Ohi Seisakusho Co., Ltd., Yokohama, Japan

[21] Appl. No.: 513,503

[22] Filed: Apr. 26, 1990

[30] Foreign Application Priority Data

Apr. 27, 1989 [JP] Japan .................................. 1-105963

[51] Int. Cl.⁵ ............................ G05D 3/10; H02P 1/22
[52] U.S. Cl. ..................................... 318/286; 318/266; 318/468; 318/293
[58] Field of Search ............... 318/256, 264, 265, 266, 318/267, 280, 286, 288, 289, 290, 291, 293, 466, 467, 468; 361/167; 307/10.2, 10.4, 125, 127

[56] References Cited

U.S. PATENT DOCUMENTS

| | | | |
|---|---|---|---|
| 3,646,402 | 2/1972 | Condon et al. | 307/127 X |
| 4,640,050 | 2/1987 | Yamagishi et al. | 49/280 |

FOREIGN PATENT DOCUMENTS

| | | | |
|---|---|---|---|
| 2518276 | 6/1983 | France | 318/293 |
| 57-25176 | 2/1982 | Japan | 318/293 |
| 1296706 | 11/1972 | United Kingdom . | |
| 2117578 | 10/1983 | United Kingdom . | |

Primary Examiner—Bentsu Ro
Attorney, Agent, or Firm—Foley & Lardner

[57] ABSTRACT

An electric system for use in a motor vehicle. The system includes a battery mounted in the vehicle body; a controlling device mounted in the vehicle body and having first and second switches; and a positive/negative switching device mounted in the vehicle body and electrically connected to the battery and the controlling device. The switching device has an output member which includes first and second output parts. The switching device assumes, when the first switch of the controlling device is turned ON, a first condition wherein the first and second output parts are charged positive and negative respectively, and assumes, when the second switch of the controlling device is turned ON, a second condition wherein the first and second output parts are charged negative and positive respectively. First and second electric devices are mounted in the door and have an input member which includes first and second input parts. The first electric device is energized only when the first and second input parts are charged positive and negative respectively, and the second electric device is energized only when the first and second input parts are charged negative and positive respectively. The feeding system further comprises a member for electrically connecting the first and second output parts to the first and second input parts.

8 Claims, 4 Drawing Sheets

FEEDING SYSTEM FOR ELECTRIC DEVICES MOUNTED IN DOOR

BACKGROUND OF THE INVENTION

1. Field of the Invention

The present invention relates in general to a feeding system for electric devices mounted in a motor vehicle, and more particularly, to a feeding system for feeding electric power from an electric power source mounted in a vehicle body to electric devices mounted in a door of the vehicle.

2. Description of the Prior Art

In the latest motor vehicles, various electric devices are mounted within the door, for example, an electric actuator for driving an electric door lock device, an electric motor for driving a power window regulator and an electric actuator for driving an automatic door closing device. Energization of these electric drives is achieved by electric power fed by an electric power source which is mounted in the vehicle body.

In case wherein the door is of a pivotal type, a bundle of lead wires is usually employed for connecting the electric power source with a power input circuit of the electric devices in the door. Usually, the bundle of the lead wires extends from the vehicle body to the pivotal door at a position where a door hinge is arranged.

While, in case wherein the door is of a slide type, an electric connector is usually employed, which comprises a first connector part mounted to the vehicle body and a second connector part mounted to the door. The first connector part is connected through suitable lead wires to the electric power source and the second connector part is connected through a suitable input circuit to the electric devices in the door. Each connector part includes a plurality of contact pins. Upon closing of the door, the second connector part is brought into engagement with the first connector part to achieve respective mating of the mutually corresponding contact pins of the two connector parts.

However, the above-mentioned conventional electric power feeding system has the following severe drawbacks.

When a plurality of electric devices are mounted in the door, the electic power feeding to them from the body-mounted power source needs a plurality of connecting elements for independently operating the electric devices. That is, in case of the pivotal door, such feeding has to be made by a plurality of lead wires which are bundled, and in case of the slide door, each connector part of the electric connector used is compelled to have a plurality of contact pins.

Of course, usage of a plurality of lead wires in case of the pivotal door causes a bulky construction of the bundle of the wires. This not only detracts from external appearance of the vehicle but also interruption to smooth the pivotal movement of the door.

Usage of a plurality of contact pins in case of the slide door causes a complicated, bulky and costly construction of the electric connector. Furthermore, when each connector part of the electric connector has a plurality of contact pins, it becomes difficult to achieve simultaneous and proper mating of the corresponding contact pins upon coupling of the two connector parts. Furthermore, the presence of a plurality of contact pins in each connector part detracts from the external appearance of the vehicle, because they are unseemly exposed to the outside of the vehicle when the door is opened.

SUMMARY OF THE INVENTION

It is therefore an object of the present invention to provide an electric power feeding system for electric devices mounted in a door, which is free of the above-mentioned drawbacks.

According to the present invention, there is provided an electric power feeding system for use in a structure which includes a first body and a second body, the second body being movable relative to the first body. The feeding system comprises an electric power source mounted in the first body and producing direct current; a controlling device mounted in the first body and having at least first and second switches; a positive/negative switching device mounted in the first body and electrically connected to the electric power source and the controlling device, the switching device having an output means which includes first and second output parts, the switching device assuming, when the first switch of the controlling device is turned ON, a first condition wherein the first and second output parts of the output means are charged positive and negative respectively, and assuming, when the second switch of the controlling device is turned ON, a second condition wherein the first and second output parts of the output means are charged negative and positive respectively; first and second electric devices mounted in the second body and having an input means which includes first and second input parts, the first electric device being energized only when the first and second input parts are charged positive and negative respectively, the second electric device being energized only when the first and second input parts are charged negative and positive respectively; and means for electrically connecting the first and second output parts of the output means to the first and second input parts of the input means.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
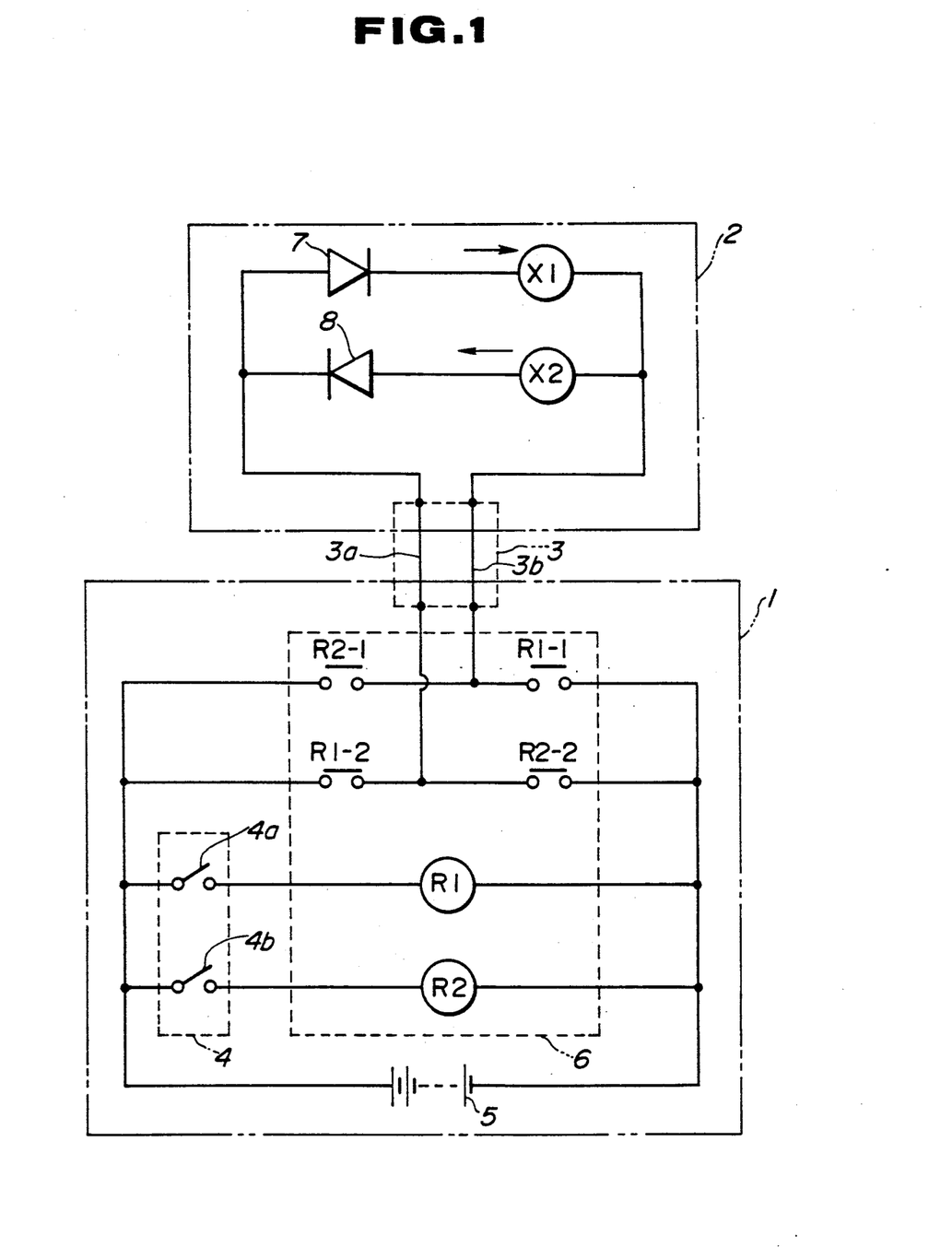
FIG. 1 is an electric circuit showing an electric power feeding system of a first embodiment of the present invention.

Referring to FIG. 1 of the drawings, there is shown an electric power feeding system which is a first embodiment of the present invention. The first embodiment is applied to a power lock device mounted in a pivotal door of a motor vehicle.

In the drawing, denoted by numeral 1 is a vehicle body and denoted by numeral 2 is a pivotal door which is pivotally connected to the vehicle body 1.

Denoted by numeral 3 is an electric connecting means which comprises a pair of wires 3a and 3b bundled and extends between the vehicle body 1 and the door 2.

As shown, the vehicle body 1 is equipped with a control device 4, a battery 5 as an electric power source and a positive/negative switching device 6. The control device 4 includes independently operated first and second switches 4a and 4b.

The positive/negative switching device 6 comprises relays R1 and R2 and normally open contacts R1-1, R1-2, R2-1 and R2-2 which are connected to the the electric connecting means 3, the control device 4 and the battery 5 in the illustrated manner.

When, with the second switch 4b kept opened, the first switch 4a of the control device 4 is closed, the relay R1 is energized and thus the contacts R1-1 and R1-2 are closed. Under this condition, electric power is fed to the electric connecting means 3 having the wires 3a and 3b charged positive and negative respectively. While, when, with the first switch 4a kept opened, the second switch 4b of the control device 4 is closed, the relay R2 is energized and thus the contacts R2-1 and R2-2 are closed. Under this condition, electric power is fed to the electric connecting means 3 having the wires 3a and 3b charged negative and positive respectively.

As shown, the door 2 is equipped with first and second electric actuating devices X1 and X2 which are connected in parallel with the wires 3a and 3b of the electric connecting means 3. It is to be noted that first and second diodes 7 and 8 are connected in series with the respective electric actuating devices X1 and X2, which diodes are directed in the opposite directions.

The first actuating device X1 is a solenoid or motor-spring combination type actuator which, upon energization thereof, moves an open lever of a door lock device in a direction to cancel a locked condition of the door. While, the second actuating device X2 is a solenoid or motor-spring combination type actuator which, upon energization thereof, moves the open lever of the door lock in a direction to achieve the locked condition of the door. Of course, this relationship between the first and second actuating devices X1 and X2 may be changed.

When, in operation, the first switch 4a of the control device 4 is closed, the relay R1 is energized and thus the corresponding contacts R1-1 and R1-2 are closed. Thus, as is described hereinabove, power feeding is made to the electric connecting means 3 having the wires 3a and 3b charged positively and negatively, respectively. Under this condition, only the first electric actuating device X1 is energized because the second diode 8 blocks the current flow to the second electric actuating device X2. Thus, the locked condition of the door 2 is cancelled.

When, thereafter, the second switch 4b of the control device 4 is closed, the other relay R2 is energized and thus the corresponding contacts R2-1 and R2-2 are closed. Thus, power feeding is so made that the wires 3a and 3b are charged negative and positive respectively. Uner this condition, only the second electric actuating device X2 is energized because in this case, the first diode 7 blocks the current flow to the first electric actuating device X1. Thus, the locked condition of the door is achieved.

It is to be noted that the above-mentioned two functions (viz., energization of the first electric actuating device X1 and that of the second electric actuating device X2) are achieved by using only two wires 3a and 3b. Hitherto, such two functions have been achieved by using at least three wires.

Figure 2:
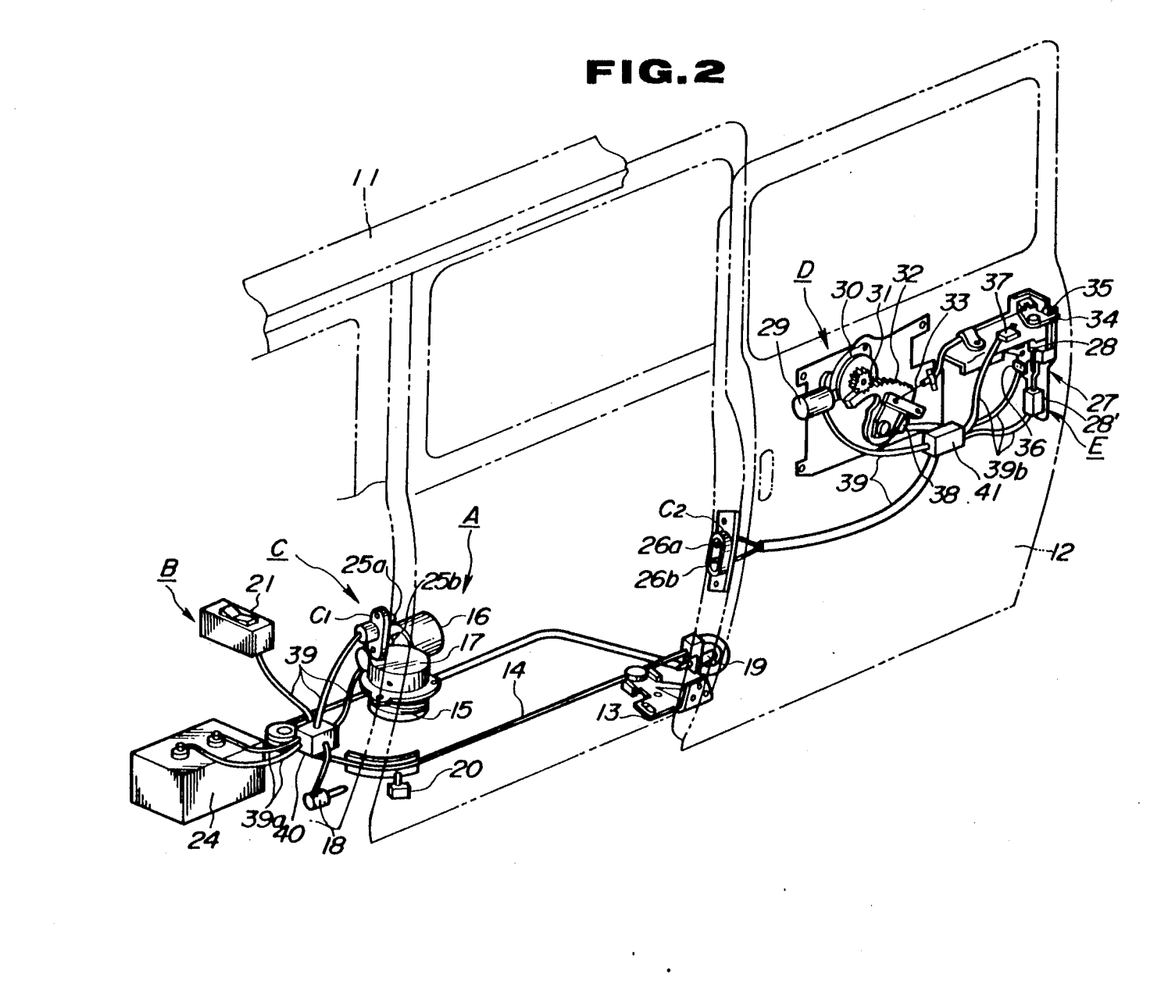
FIG. 2 is a perspective view of a power slide door to which a second embodiment of the present invention is applied.
Figure 3:
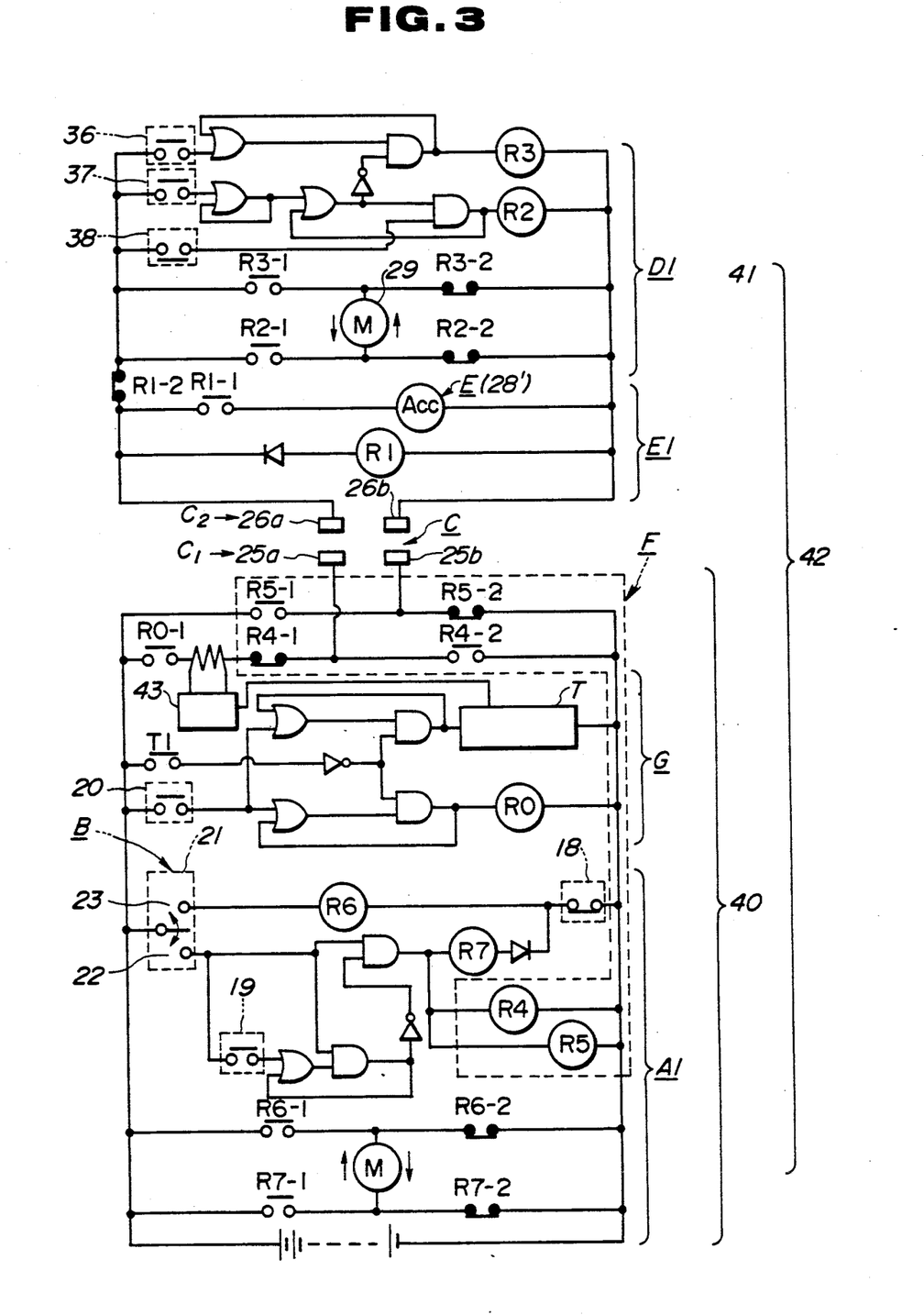
FIG. 3 is an electric circuit of the second embodiment of the invention.

Referring to FIGS. 2 and 3, there is shown a second embodiment of the present invention. As will become apparent as the description proceeds, the electric power feeding system of the second embodiment is applied to a power slide door of a motor vehicle.

In FIG. 2, denoted by numeral 11 is a vehicle body, and denoted by numeral 12 is a power slide door. Although not shown in the drawing, a known door guide structure is employed by which, in opening operation, the door 12 in the full-close position is moved sideward and then rearward toward the full-open position. The movement of the door 12 from the full-open positiobn to the full-close position is carried out in a reversed manner.

As is shown, at a lower portion of the vehicle body 11, there is arranged a door driving mechanism "A" by which the door 12 is driven between the full-close and full-open positions travelling the way defined by the door guide structure.

The door driving mechanism "A" is described in U.S. Pat. No. 4,640,050. The mechanism "A" will be briefly described in the following with reference to the drawing.

A bracket 13 is secured to a front lower portion of the slide door 12. The bracket 13 has a drive cable 14 fixed thereto, which cable has a part extending along the way of the door 12. The cable 14 has both end portions wound around a drive drum 15. The drum 15 is driven by a reversable electric motor 16 through a speed reduction gear 17. Thus, upon energization of the motor 16, the drive drum 15 is rotated in one or the other direction thereby to move the slide door 12 in opening or closing direction along the side of the vehicle body 11.

The door driving mechanism "A" is controlled by a door-close detecting switch 18 and a door-open detecting switch 19. The door-close detecting switch 18 is of a normally closed type, which is mounted on the vehicle body 11 and turned OFF when the door 12 comes to the full-close position. For this operation, the switch 18 has an antenna pin which is contactable with a front end of the door 12. The door-open detecting switch 19 is of a normally open type, which is mounted on the vehicle body 11 and turned ON when the door 12 comes to the full-open position. For this operation, the switch 19 has an antenna plunger which is contactable with a rear end of the bracket 13 of the door 12.

The vehicle body 11 has a so-called "feeding start position detecting switch" 20 mounted thereto. The switch 20 is of a normally open type and is so constructed and arranged as to close for a moment only when the front end of the slide door 12, during closing movement thereof, passes a so-called "feeding start position" which is near a so-called "half-latch available position" where the door 12 can assume an after-mentioned half-latched condition. It is to be noted that when the front end of the door 12 assumes the feeding start position, there is defined a small clearance between the front end of the door 12 and a front end of the door opening, which clearance is so sized as not to permit insertion of a hand of a person therethrough. More specifically, the clearance is somewhat greater than a clearance which is defined when the door 12 assumes the half-latch available position.

Designated by reference "B" is a controlling device which is mounted on the vehicle body 11. The controlling device "B" comprises a seesaw type button switch 21.

As will be seen from FIG. 3, the button switch 21 comprises a common movable contact and two stationary contacts. The movable contact and one stationary contact constitute a so-called "door opening control switch" 22 and the movable contact and the other stationary contact constitute a so-called "door closing control switch" 23. That is, when the button is pivoted in one direction, the switch 22 is closed, while, when the button is pivoted in the other direction, the other switch 23 is closed.

Referring back to FIG. 2, designated by numeral 24 is a battery which serves electric power source.

Designated by reference "C" is an electric connector which comprises engagable first and second connector parts $C_1$ and $C_2$ each including two contact pins $25a$ and $25b$ (or, $26a$ and $26b$). Each contact pin is biased to project by a spring associated therewith. The first connector part $C_1$ is mounted on a front end of the door opening having the contact pins thereof directed rearward and the second connector part $C_2$ is mounted on a front end of the slide door 12 having the contact pins thereof directed forward.

The first and second connector parts $C_1$ and $C_2$ are engaged when the door 12 closes. More specifically, when the slide door 12 assumes a position between the feeding start position and the full-close position, the contact pins $25a$ and $25b$ of the first connector part $C_1$ and the corresponding contact pins $26a$ and $26b$ of the second connector part $C_2$ are in contact with each other. Thus, under this condition, electric power feeding from the battery 24 on the vehicle body 11 to aftermentioned electric devices on the slide door 12 is available.

The contact pins $25a$ and $25b$ of the first connector part $C_1$, the motor 16, the door-close detecting switch 18, the door-open detecting switch 19, the control device "B", the feeding start position detecting switch 20 and the battery 24 are connected through suitable lead wires $39a$ to a body-mounted control unit 40.

Within the slide door 12, there is mounted a door closing device "D" which functions to assist the door driving mechanism "A" in the movement of the door 12 from the half-latch position to the full-close position. In fact, this movement is not easily achieved by only the door driving mechanism "A" because a great resistance is produced by a door seal (not shown) when the door 12 is shifted to the half-latch position to the full-close position.

When the door 12 comes to the half-latch available position, a latch pawl (not shown) of a door lock device 27 becomes incompletely or only partly engaged with a striker (not shown) which is secured to the vehicle body, and thereafter, due to the work of the door closing device "D", the latch pawl is forced to turn to achieve a complete engagement with the striker forcing the door 12 to move to the full-close latched position.

Within the slide door 12, there is further mounted a door unlatching device "E" which functions to cancel the latched condition of the closed slide door 12. For this operation, the door unlatching device "E" has an open lever 28 incorporated with the door lock device 27 and a solenoid-spring combination type actuator 28' incorporated with the open lever 28. That is, upon energization of the actuator 28', the open lever 28 is pulled in a direction to cancel the latched condition of the door lock device 27. Thus, the slide door 12 becomes un-latched and thus thereafter the opening movement of the door 12 is available.

The door closing device "D" is disclosed in U.S. patent application Ser. No. 07/287,277 filed Dec. 21, 1988 in the name of Jun YAMAGISHI et al. In the following, the device "D" will be briefly described with reference to FIG. 2.

The device "D" comprises an electric motor 29, a speed reduction gear 30 driven by the motor 29, a pinion 31 driven by an output shaft of the gear 30 and a sector gear 32 meshed with and thus driven by the pinion 31.

When the motor 29 is energized to run in normal direction, the sector gear 32 pivots in a counterclockwise direction in FIG. 2 thereby pulling a cable 33 which leads to a close lever 34. With this movement, the close lever 34 is pivoted in one direction to move the latch pawl to the full-latch position. With this, the slide door 12 is forced to move from the half-latch position to the full-close latched position. Designated by numeral 35 is an arm possessed by the latch pawl, against which the close lever 34 actually abuts for the movement of the latch pawl.

When, thereafter, the motor 29 is energized to run in reverse direction, the sector gear 32 and thus the close lever 34 are moved in the other directions, and finally, they are returned to their original positions. The close lever 34 stops at a position remote from the arm 35 of the latch pawl. It is to be noted that under this condition, the full-close latched condition of the door 12 is kept.

Designated by numeral 36 is a half-latch detecting switch mounted to the door lock device 27, which functions to detect arrival of the door 12 to the half-latch available position. That is, the switch 36 is turned ON when, upon abutment of the striker against the latch pawl due to the arrival of the door 12 to the half-latch available position, the open lever 28 is slightly turned in the lock cancelling direction.

Designated by numeral 37 is a full-latch detecting switch mounted to the door lock device 27, which functions to detect the full-latch condition of the door lock device 27. That is, the switch 37 is turned ON when the close lever 34 abuts on the switch 37 turning the latch pawl to the full-latch position.

Designated by numeral 38 is a so-called "return recognition switch" which detects that the sector gear 32 has returned to a rest position or not. The switch 38 is kept OFF when the sector gear 32 is in the rest position as shown in FIG. 2, but turned ON when the sector gear 32 is pivoted away from the rest position.

The motor 29, the half-latch detecting switch 36, the full-latch detecting switch 37, the return recognition switch 38 and the actuator 28' are connected through suitable lead wires $38b$ to a door-mounted control unit 41. The contact pins $26a$ and $26b$ of the second connector part $C_2$ are connected to the control unit 41 through lead wires $39b$, as shown.

FIG. 3 shows the electric circuit of the electric power feeding system 42 of the second embodiment.

The power feeding system 42 comprises generally the body-mounted control unit 40 and the door-mounted control unit 41.

The body-mounted control unit 40 comprises a control device "A1" which controls the door driving mechanism "A", a positive/negative switching device "F" which switches the polarity of electric power fed to the contact pins $25a$ and $25b$ of the first connector part $C_1$ in response to operation of the controlling device "B", and a time counting device "G" which controls, by using a timer "T", the time for which current feeding is carried out during closing movement of the door 12.

The door-mounted control unit 41 comprises a control device "D1" which controls the door closing device "D" and a control device "E1" which controls the door unlatching device "E".

In FIG. 3, denote by references "R0", "R1", "R2" ... "R7" are relays, "R0-1", "R1-1", "R2-1" ... "R7-2" are contacts. "T1" is a timer contact of the timer "T", and denoted by numeral 43 is a current detector which resets the timer "T" when detecting that a predetermined degree of current flows through a series circuit which includes the contact "R0-1" and the contact "R4-2". The current detected by the current detector 43 is sufficient for operating the motor 29. AND gates, OR gates, inverters and diodes are arranged in the respective circuits in the illustrated manner.

In the following, operation of the second embodiment will be described with reference to FIGS. 2 and 3.

For ease of description, the same will be commenced with respect to the full-close latched condition of the slide door 12. Under this condition, the first and second connector parts "$C_1$" and "$C_2$" of the electric connector "C" are coupled, the controlling device "B" (viz., button switch 21) assumes a neutral position, the door-close detecting switch 18 is opened, the full-latch detecting switch 37 is closed, the normally open switches are opened, the normally close switches are closed and the relays are all deenergized.

When, now, the door opening control switch 22 of the controlling device "B" is closed by, for example, a passenger in the vehicle, the relays "R4" and "R5" are simultaneously energized causing the normally open contacts "R4-2" and "R5-1" to close and the normally close contacts "R4-1" and "R5-2" to open. Upon this, electric power is fed to the electric connector "C" having the contact pins 25a and 25b charged negative and positive respectively.

Thus, a circuit including the contact pin 26b, the relay "R1", the diode and the contact pin 26a is established and thus, the relay "R1" is energized.

Upon this, the contact "R1-1" of the relay "R1" is closed energizing the actuator 28' of the door unlatching device "E", and at the same time, the contact "R1-2" of the relay "R1" is opened deenergizing the door closing device control device "D1".

Upon operation of the actuator 28', the open lever 28 of the door lock device 27 is turned in a direction to cancel the locked condition of the door 12, so that the door 12 is slightly opened due to the biasing force produced by the door seal.

Upon this, the door-close detecting switch 18 is closed energizing the relay "R7" and thus causing the contact "R7-1" and "R7-2" to close and open respectively. Thus, a circuit including the contact "R7-1", the motor 16, and the contact "R6-1" is established and thus the motor 16 is energized to run in normal direction. With this, the door 12 is moved in a direction to open the door opening.

When the door 12 passes the feeding start position, the second connector part $C_2$ of the electric connector C is uncoupled from the first connector part $C_1$ and thus current feeding to the door-mounted electric devices is shut off. Upon this, the relay "R1" is deenergized and the actuator 28' is deenergized, and thus, the open lever 28 of the door unlatching device "E" is returned to its original position.

Due to continuous work of the door driving mechanism "A", the door 12 is continued to move in the opening direction. When the door 12 is moved to the full-open position, the door-open detecting switch 19 is closed.

With this, the relays "R7", "R4" and "R5" are all deenergized at the same time, and the contacts of them are returned to the original positions. Thus, electric feeding to the motor 16 is ceased, and current flow toward the first connector part "$C_1$" of the electric connector "C" is ceased.

When, with the door 12 assuming the full-open or half-open position, the door closing control switch 23 of the controlling device "B" is closed by, for example, a passenger, the relay "R6" is energized.

Upon this, the contact "R6-1" is closed and the contact "R6-2" is opened and a circuit including the contact "R6-1", the motor 16 and the contact "R7-2" is established. Thus, the motor 16 is energized to run in reversed direction.

With this, the door 12 is moved in a direction to close the door opening.

When the door 12 comes to the feeding start position, the second connector part "$C_2$" and the first connector part "$C_1$" of the electric connector "C" are coupled and the feeding start position detecting switch 20 is closed for a moment.

With this, the relay "R0" and the timer "T" are energized and thus they are brought to a self-hold condition.

When, due to energization of the relay "R0", the contact "R0-1" is closed, the contact pin 25a of the first connector part $C_1$ is connected through the contacts "R0-1" and "R4-1" to the positive terminal of the battery 24 (viz., electric power source), and the other contact pin 25b is connected through the contact "R5-2" to the negative terminal of the battery 24. That is, under this condition, electric power is fed to the electric connector "C" having the contact pins 25a and 25b charged positive and negative respectively, unlike the above-mentioned case wherein the door 12 is being opened.

The timer "T" is so constructed that when, after charging of the timer, a predetermined time passes (for example, ten seconds), the timer contact "T1" is closed.

That is, when, due to presence of a foreign object caught between the door 12 and the vehicle body 11, the door 12 is forced to stop at a position between the feeding start position and the half-latch available position and the predetermined time passes, the timer contact "T1" is closed and thus the relay "R0" is deenergized. Thus, power feeding toward the electric connector "C" is ceased and power feeding to the timer "T+ is also ceased. These prevent waste of electric power.

When, within the predetermined time, the motor 29 of the door closing device "D" is operated in an after-mentioned manner and thus a certain degree of current flows through the series circuit which includes the contact "R0-1" and the contact "R4-2", the current detector 43 resets the timer "T". Thus, thereafter, the timer "T" starts the time counting again.

Accordingly, even when the motor 29 starts its operation just before the time when the predetermined time elapses, the relay "R0" is never instantly deenergized, inducing instant stop of power feeding to the motor 29.

That is, from the time when the timer "t" is reset, power feeding to the door-mounted electric devices is continued for a time sufficient for operating the motor 29 to accomplish the movement of the slide 12 from the half-latch position to the full-close latched position.

Even when the operation of the motor 29 is continued for a considerably longer time because, for example, a foreign object is caught between the door 12 and the vehicle body 11, the operation of the motor 29 stops at the time when the predetermined time set by the timer "T" elapses. Thus, safety of the motor 29 is assured. That is, upon expiration of the predetermined time, the timer contact "T1" of the timer "T" is closed and thus the relay "RO" is deenergized causing deenergization of the motor 29.

When, after starting of the power feeding to the electric devices in the door 12, the door 12 is moved to the half-latch available position due to the continuous work of the door driving mechanism "A", the half-latch detecting switch 36 of the door closing device control device "D1" is momently closed. Thus, the relay "R3" is energized and the same is kept in the self-hold condition.

With this, the contact "R3-1" is closed, the contact "R3-2" is opened, and the circuit including the contact "R3-1", the motor 29 and the contact "R2-2" is established, so that the motor 29 is energized to run in normal direction.

With this, the sector gear 32 of the door closing device "D" is pivoted in a counterclockwise direction in FIG. 2 pulling the cable 33 leftward. Thus, as has been mentioned hereinabove, the latch pawl of the door lock device 27 is forced to achieve a complete engagement with the striker moving the door 12 to the full-close latched position. This movement of the door 12 is achieved in cooperation with the work of the door driving mechanism "A".

When the sector gear 32 is pivoted in a counterclockwise direction in FIG. 2 from the rest position, the return recognition switch 3B is closed or turned ON.

When the latch pawl of the door lock device 27 is turned to the full-latch position, the full-latch detecting switch 37 is closed causing deenergization of the relay "R3" and energization of the relay "R2".

With this, the contacts "R3-1" and "R3-2" are closed, so that a circuit including the contact "R2-1", the motor 29 and the contact "R3-2" is established energizing the motor 29 to run in reverse direction.

With this, the sector gear 32 is pivoted in a clockwise direction to the rest position as shown in FIG. 2.

Upon this, the return recognition switch 38 is opened causing deenergization of the relay "R2". Thus, the contact "R2-1" is opened and the contact "R3-2" is closed, so that the motor 29 is deenergized. Thus, the motor 29 stops.

When, thereafer, the predetermined time set by the timer "T" elapses, the relay "RO" is deenergized causing the contact "RO-1" to open. With this, electric power feeding to the electric connector "C" stops.

As is described hereinabove, turning the latch pawl of the door lock device 27 to the full-latch position induces the full-close latched condition of the door 12.

When the door 12 comes to the full-close latched position, the door-close detecting switch 18 becomes opened deenergizing the relay "R6". Thus, the contact "R6-1" is opened and the other contact "R6-2" is closed, so that the motor 16 of the door driving mechanism "A" is deenergized. With this, the door 12 assumes the full-close latched condition having the electric devices kept deenergized.

Figure 4:
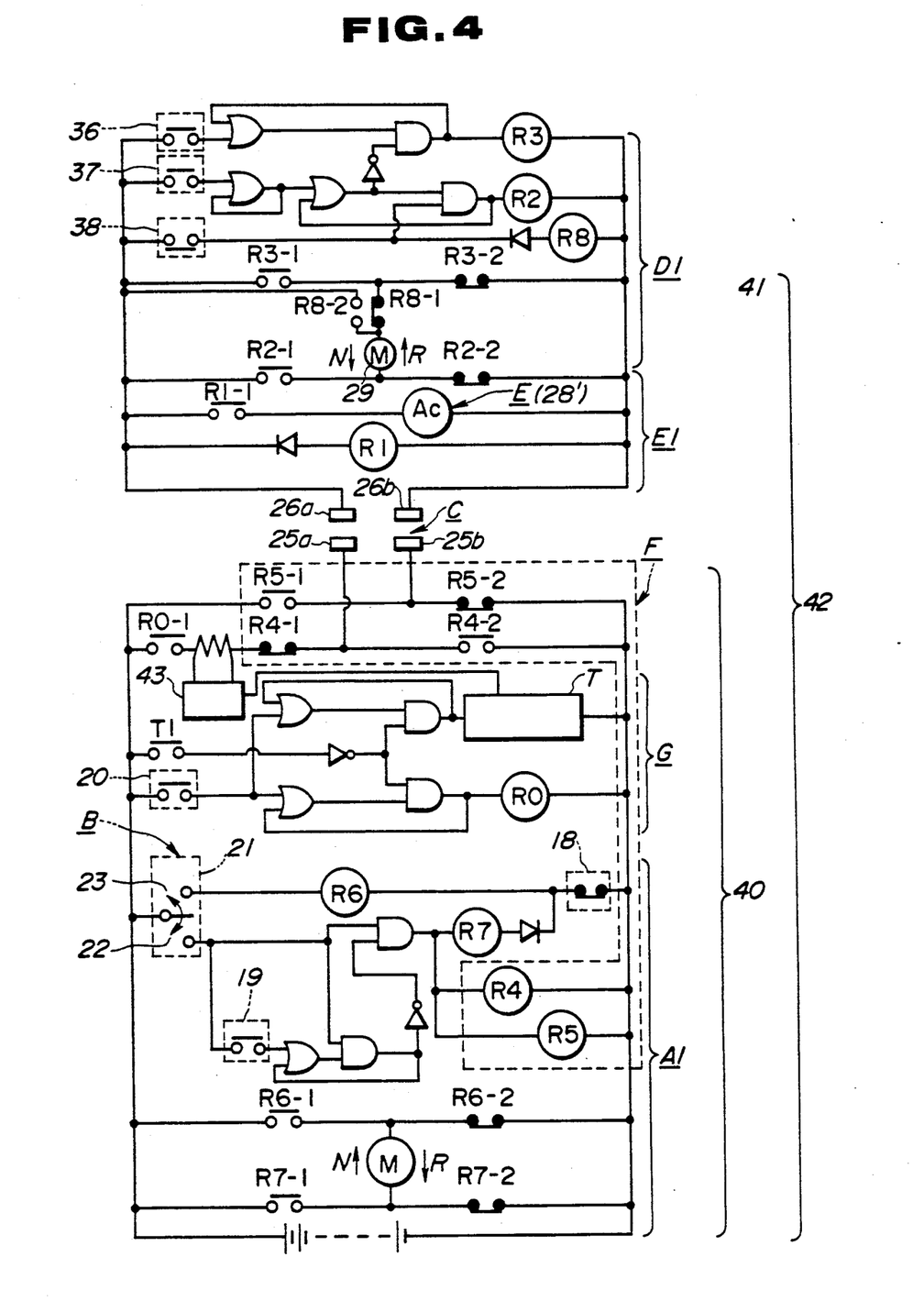
FIG. 4 is an electric circuit showing an electric power feeding system of a third embodiment of the present invention.

Referring to FIG. 4, there is shown an electric power feeding system of a third embodiment of the present invention, which is applied to a power slide door of a motor vehicle.

The power slide door to which the third embodiment is applied is substantially the same as that of the second embodiment of FIG. 2.

Furthermore, the electric power feeding system of the third embodiment is very similar to that of the above-mentioned second embodiment of FIG. 3.

Thus, in the following, only the construction and parts which are different from those of the second embodiment will be described in detail.

As will be seen from FIG. 4, in the third embodiment, a circuit illustrated by thick lines is additionally employed in the door-mounted control unit 41, and means corresponding to the contact "R1-2" of the second embodiment is not provided in the unit 41.

That is, a diode and a relay "R8" are connected in series with the return recognition switch 38. A normally close contact "R8-1" of the relay "R8" is interposed between the motor 29 and a junction line between the contact "R3-1" and "R3-2", and a normally open contact "R8-2" of the relay "R8" is interposed between the contact pin 26a of the door-mounted second connector part C$_2$ and a junction line between the contact "R8-1" and the motor 29.

With such modifications, an advantageous operation is carried out in a case wherein after, due to counterclockwise pivoting of the sector gear 32 (see FIG. 2), the return recognition switch 38 is turned ON, a foreign thing is accidentally caught between the door 12 and the vehicle body 11 to stop movement of the door 12. In such case, due to operation of the time "T", the operation of the motor 29 stops before the latch pawl of the door lock device 27 is turned to the full-latch position, so that the sector gear 32 stops at a position remote from the rest position.

However, in the third embodiment, the undesired matter can be eliminated by manipulating the controlling device "B". That is, in such case, the door opening control switch 22 of the controlling device "B" is manipulated to turn ON switching the polarity of electric current fed to the door-mounted electric devices. With this, energization of both the actuator 28' of the door latching device "E" and the relay "R8" is carried out, so that the contact "R8-1" is opened and the other contact "R8-2" is closed causing the motor 29 to run in reversed direction. Thus, the sector gear 32 can be returned to the rest position.

When the sector gear 32 comes to the rest position, the return recognition switch 38 is opened and the relay "R8" is deenergized, and thus operation of the door closing device "D" stops.

Thus, by manipulating the controlling device "B", the door 12 can be moved back to a desired open position for removing the foreign thing. Thereafter, the door closing control switch 23 of the controlling device "B" may be turned ON again for closing the door 12.

During normal opening movement of the door 12, the sector gear 32 of the door closing device "D" does not move from the rest position. Thus, the return recognition switch 38 is kept OFF and thus the relay "R8" is kept deenergized.

During normal closing movement of the door 12, energization of the relay "R8" does not occur due to presence of the diode which is connected in series with the relay "R8".

What is claimed is:

1. An electric system for use in a structure which includes a first body and a second body, said second body being movable relative to said first body, said system comprising:

an electric source mounted in said first body and producing direct current;

a controlling device mounted in said first body and having at least first and second switches;

a positive/negative switching device mounted in said first body and electrically connected to said electric source and said controlling device, said switching device having an output means which includes first and second output parts said switching device assuming, when said first switch of said controlling device is turned ON, a first condition wherein said first and second output parts of said output means are charged positive and negative respectively, and assuming, when said second switch of said controlling device is turned ON, a second condition wherein said first and second output parts of said output means are charged negative and positive respectively;

electric drive means for driving, when said first switch of said controlling device is turned ON, said second body in one direction relative to said first body, and driving, when said second switch of said controlling device is turned ON, said second body in another direction relative to said first body;

first and second electric devices mounted in said second body and having an input means which includes first and second input parts, said first electric device being energized only when said first and second input parts are charged positive and negative, respectively, said second electric device being energized only when said first and second input parts are charged negative and positive, respectively; and means for electrically connecting said first and second output parts of said output means to said first and second input parts of said input means, said connecting means being an electric connector which comprises;

a first connector part mounted to said first body and having therein first and second contact pins which serve as said first and second output parts;

a second connector part mounted to said second body and having therein first and second contact pins which serve as said first and second input parts;

wherein said first and second connector parts are engaged to establish electric connection between the corresponding contact pins thereof only when said second body assumes a given position relative to said first body.

2. An electric system as claimed in claim 1, in which said connecting means comprises:

a first wire which extends between said first output part of said output means and said first input part of said input means; and a second wire which extends between said second output part of said output means and said second input part of said input means.

3. An electric system as claimed in claim 1, in which each of said first and second electric devices is connected in series with a diode.

4. An electric system for use in a motor vehicle which includes a vehicle body and a slide door, said door being slidably movable relative to said vehicle body, said system comprising:

an electric source mounted in said vehicle body and producing direct current;

a controlling device mounted in said vehicle body and having at least first and second switches;

a positive/negative switching device mounted in said vehicle body and electrically connected to said electric source and said controlling device, said switching device having an output means which includes first and second output parts, said switching device assuming, when said first switch of said controlling device is turned ON, a first condition wherein said first and second output parts of said output means are charged positive and negative respectively, and assuming, when said second switch of said controlling device is turned ON, a second condition wherein said first and second output parts of said output means are charged negative and positive, respectively;

electric drive means for driving, when said first switch of said controlling device is turned ON, said slide door in a closing direction relative to said vehicle body, and driving, when said second switch of said controlling device is turned ON, said slide door in an opening direction relative to said vehicle body;

an electric actuator and an electric door closing device which are mounted in said slide door and have an input means which includes first and second input parts, said electric actuator being energized to cancel a locked condition of a door lock device only when said first and second input parts are charged positive and negative, respectively, said electric door closing device being energized to move the door to a full-close latched position only when said first and second input parts are charged negative and positive respectively; and means for electrically connecting said first and second output parts of said output means to said first and second input parts of said input means, said connecting means being an electric connector which comprises;

a first connector part mounted to said vehicle body and having therein first and second contact pins which serve as said first and second output parts; and a second connector part mounted to said slide door and having therein first and second contact pins which serve as said first and second input parts;

wherein said first and second connector parts are engaged to establish electric connection between the corresponding contacts pins thereof when said slide door comes to an almost closed position relative to said vehicle body.

5. An electric system as claimed in claim 4, in which said connecting means comprises:

a first wire which extends between said first output part of said output means and said first input part of said input means; and a second wire which extends between said second output part of said output means and said second input part of said input means.

6. An electric system as claimed in claim 4, in which each of said electric actuator and said electric door closing device is connected in series with a diode.

7. An electric system as claimed in claim 4, in which:
said electric actuator cancels a locked condition of a door lock device when energized; and
said electric door closing device moves the door to a full-close latched position when energized.

8. An electric system as claimed in claim 4, in which said electric actuator is an electric motor, said motor being energized to run in one direction when said first switch of said controlling device is turned ON and run in the other direction when said second switch of said controlling device is turned ON.

* * * * *